United States Patent
Bojan

(10) Patent No.: US 6,701,079 B1
(45) Date of Patent: Mar. 2, 2004

(54) POSITION INFORMATION RECORDING CAMERA

(76) Inventor: William Z. Bojan, 2407 Everest Pkwy., Cape Coral, FL (US) 33904

(*) Notice: Subject to any disclaimer, the term of this patent is extended or adjusted under 35 U.S.C. 154(b) by 47 days.

(21) Appl. No.: 10/273,698

(22) Filed: Oct. 18, 2002

(51) Int. Cl.[7] .............................................. G03B 17/24
(52) U.S. Cl. ...................................... 396/310; 396/429
(58) Field of Search ................................. 396/310–322, 396/429; 348/116, 135, 552

(56) References Cited

U.S. PATENT DOCUMENTS 5,296,884 A * 3/1994 Honda et al. ............... 396/311
5,506,644 A * 4/1996 Suzuki et al. ............... 396/319
6,542,622 B1 * 4/2003 Nelson et al. ............... 382/112

* cited by examiner

Primary Examiner—David M. Gray

(57) ABSTRACT

A position information recording camera comprises a satellite position sensor connected to a conventional camera that would encode GPS information relative to the camera location on an encoded photographic image. A central processing unit is electrically connected to the satellite position sensor. A recorder is electrically connected to the central processing unit and is capable of recording an encoded position measurement derived from the satellite position data on a photographic impression.

5 Claims, 3 Drawing Sheets

POSITION INFORMATION RECORDING CAMERA

BACKGROUND OF THE INVENTION

1. Field of the Invention

The present invention relates to a position information recording camera for use in connection with camera accessories. The position information recording camera has particular utility in connection with satellite positioning systems that may be connected to a camera to imprint positioning data on a photograph.

2. Description of the Prior Art

Position information recording cameras are desirable as an improvement to conventional film or digital cameras that would automatically document the current location where the still-image or video recording was made.

The use of camera accessories is known in the prior art. For example, U.S. Pat. No. 5,913,078 to Kimura et al discloses a camera utilizing a satellite positioning system that receives an electric wave including position information from a satellite of Global Positioning System. The camera then records on a photograph the position together with a photographed image. Wherein if a photographing attitude of the camera is arbitrarily changed in accordance with an image to be photographed, the camera comprises an enabling device to make the receiving of the electric wave through an antenna possible regardless of the photographing attitude of the camera. However, the Kimura et al '078 patent does not have a satellite positioning recording capability that may be visually invisibly encoded into a recorded image.

Similarly, U.S. Pat. No. 5,506,644 to Suzuki et al discloses a camera that includes position information recorder incorporated into the camera. A position measurement unit receives position information via a GPS which is a position measurement system using satellites and that performs position measurement to calculate a position. A receiving state determination unit determines the state of receiving the position information. A memory stores position measurement data, and a magnetic recording unit records data in the magnetic recording area of film. When position measurement data cannot be fetched, position measurement information stored in the memory immediately before is read out and recorded. However, the Suzuki et al '644 patent does not have a satellite positioning recording capability that may he visually invisibly encoded into a recorded image.

Lastly, U.S. Pat. No. 5,296,884 to Honda et al discloses a camera having a data recording function that has means for receiving an electric wave which is transmitted from an external device in a wireless manner (e.g., equipment for radio navigation systems, satellites and radio stations). When an image of an object is recorded at every shot on a recording medium loaded in said camera, a data corresponding to every shot is recorded in accordance with the electric wave received by said receiving means. Preferably said camera further has means for detecting a place where the photo-taking operation is carried out and in accordance with the detection of said detecting means, the data corresponding to every shot is recorded. Thus, records of the object image together with data relating to place can be obtained without any manual operation prior to every photo-taking operation. However, the Honda et al '884 patent does not have a satellite positioning recording capability that may be visually invisibly encoded into a recorded image.

While the above-described devices fulfill their respective, particular objectives and requirements, the aforementioned patents do not describe a position information recording camera that allows satellite positioning systems that may be connected to a camera to imprint positioning data on a photograph. The Kimura et al '078, Suzuki et al '644 and Honda et al '884 patents make no provision for a satellite positioning recording capability that may be visually invisibly encoded into a recorded image.

Therefore, a need exists for a new and improved position information recording camera which can be used for satellite positioning systems that may be connected to a camera to imprint positioning data on a photograph. In this regard, the present invention substantially fulfills this need.

In this respect, the position information recording camera according to the present invention substantially departs from the conventional concepts and designs of the prior art, and in doing so provides an apparatus primarily developed for the purpose of satellite positioning systems that may be connected to a camera to imprint positioning data on a photograph.

SUMMARY OF THE INVENTION

In view of the foregoing disadvantages inherent in the known types of camera accessories now present in the prior art, the present invention provides an improved position information recording camera, and overcomes the above-mentioned disadvantages and drawbacks of the prior art. As such, the general purpose of the present invention, which will be described subsequently in greater detail, is to provide a new and improved position information recording camera and method which has all the advantages of the prior art mentioned heretofore and many novel features that result in a position information recording camera which is not anticipated, rendered obvious, suggested, or even implied by the prior art, either alone or in any combination thereof.

To attain this, the present invention essentially comprises a satellite position sensor connected to a conventional camera. The satellite position sensor is capable of outputting satellite position data A central processing unit is electrically connected to the satellite position sensor. The central processing unit is capable of deriving a position measurement from said satellite position data. A recorder is connected to the conventional camera. The recorder is electrically connected to the central processing unit. The recorder is capable of recording an encoded position measurement derived from the satellite position data on a photographic impression.

There has thus been outlined, rather broadly, the more important features of the invention in order that the detailed description thereof that follows may be better understood and in order that the present contribution to the art may be better appreciated.

The invention may also include a position measurement complete circuit, an encoding switch, a visible ink cartridge, a ultraviolet ink cartridge and a memory module. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved position information recording camera that has all of the advantages of the prior art camera accessories and none of the disadvantages.

It is another object of the present invention to provide a new and improved position information recording camera that may be easily and efficiently manufactured and marketed.

An even further object of the present invention is to provide a new and improved position information recording camera that has a low cost of manufacture with regard to both materials and labor, and which accordingly is then susceptible of low prices of sale to the consuming public, thereby making such position information recording camera economically available to the buying public.

Still another object of the present invention is to provide a new position information recording camera that provides in the apparatuses and methods of the prior art some of the advantages thereof, while simultaneously overcoming some of the disadvantages normally associated therewith.

Even still another object of the present invention is to provide a position information recording camera for satellite positioning systems that may be connected to a camera to imprint positioning data on a photograph.

Lastly, it is an object of the present invention is to provide a position information recording camera that would automatically document the current location where the still image or video image was made.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
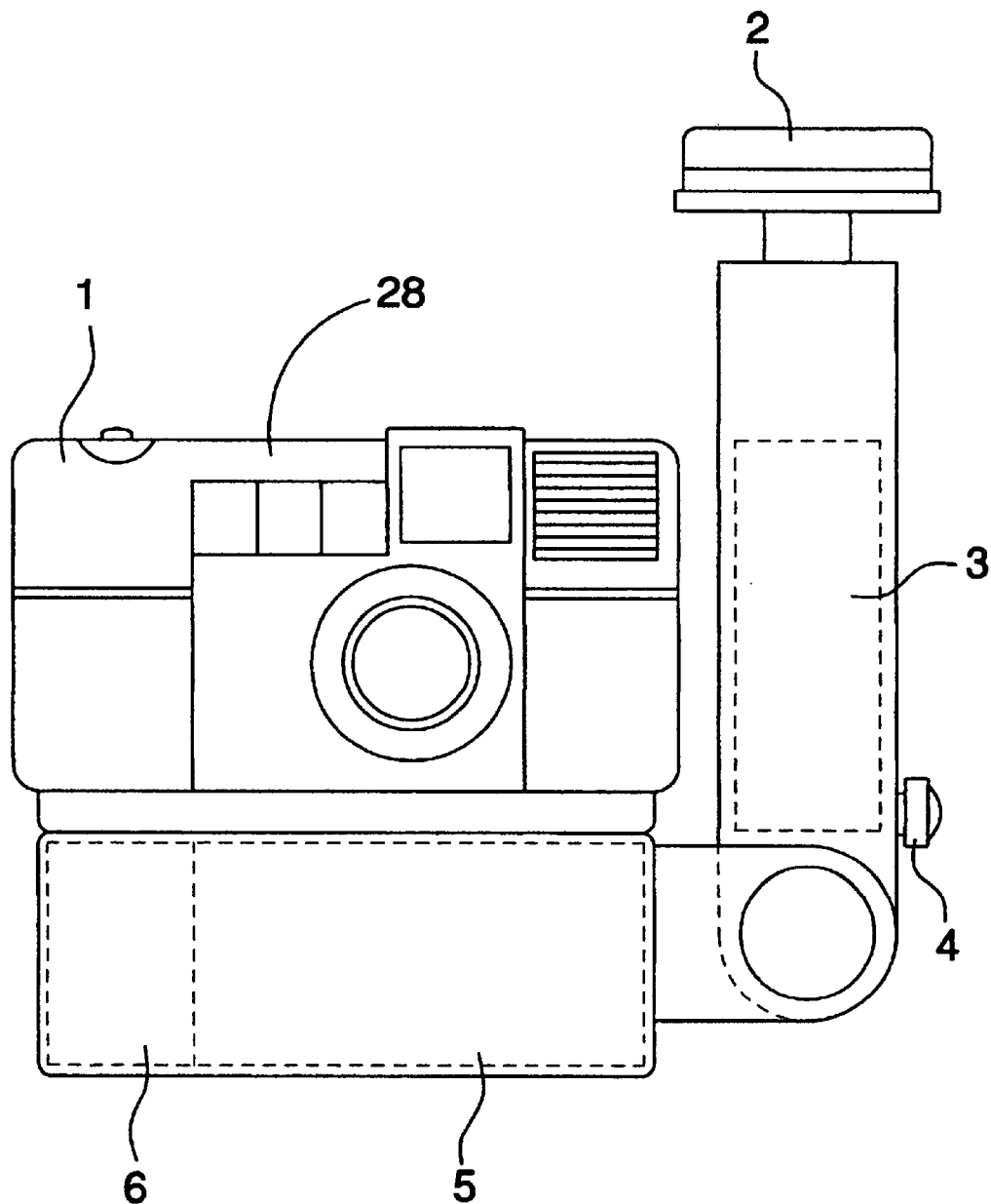
FIG. 1 is a front side view of a conventional position information recording camera.
Figure 2:
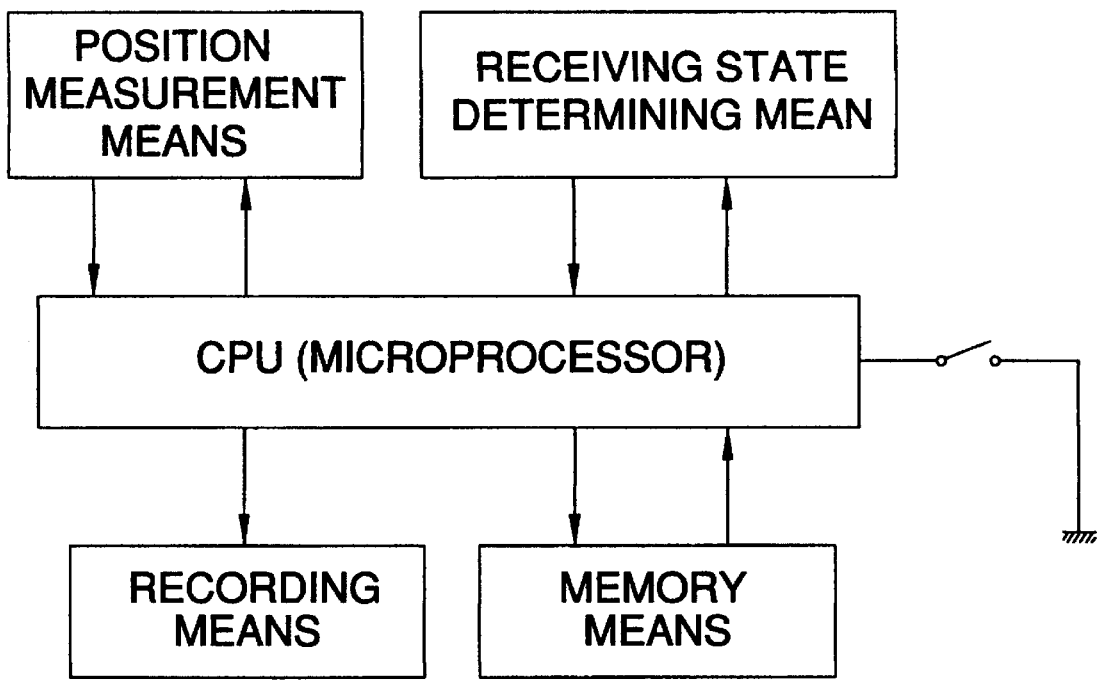
FIG. 2 is a block diagram view of a conventional position information recording camera.
Figure 3:
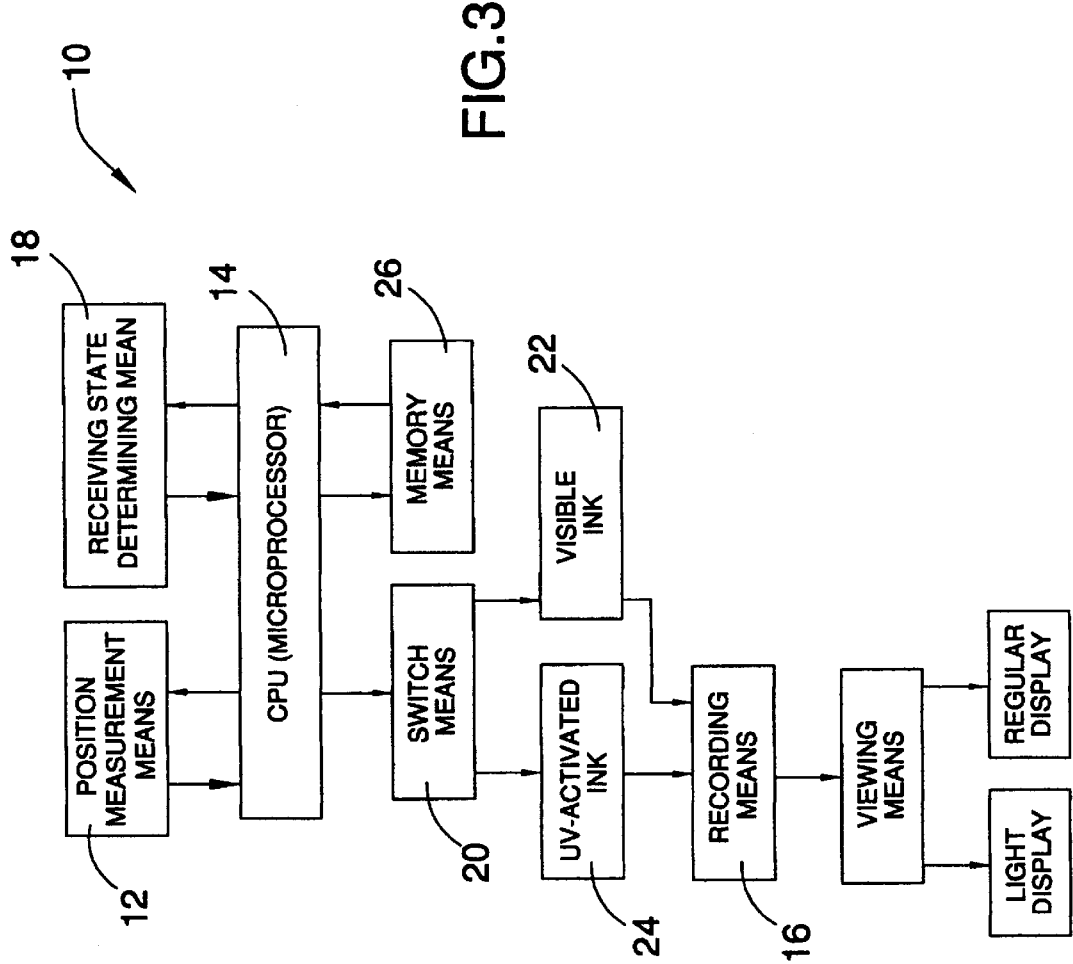
FIG. 3 is a block diagram view of the preferred embodiment of the position information recording camera constructed in accordance with the principles of the present invention.

Referring now to the drawings, and particularly to FIGS. 1–3, a preferred embodiment of the position information recording camera of the present invention is shown and generally designated by the reference numeral 10.

In FIG. 1 a conventional camera with position recording is shown. The camera is bulky with a sensor module that has to be rotated to an upright position to work correctly. Also this camera does not have the capability of encoding the position recorded with ultraviolet ink upon the photograph.

In FIG. 2 a block diagram of a conventional camera with position recording is shown. This block diagram does not show the capability of encoding the position recorded with ultraviolet ink upon the photograph.

In FIG. 3, a new and improved position information recording camera 10 of the present invention for satellite positioning systems that may be connected to a camera to imprint positioning data on a photograph is illustrated and will be described. More particularly, the position information recording camera 10 has a satellite position sensor 12 connected to a conventional camera 28. The satellite position sensor 12 is capable of outputting satellite position data. The satellite position sensor is orientation insensitive. A central processing unit 14 is electrically connected to said satellite position sensor 12. The central processing unit 14 is capable of deriving a position measurement from the satellite position data. A recorder 16 is connected to the conventional camera 28. The recorder 16 is electrically connected to said central processing unit 14. The recorder 16 is capable of recording an encoded position measurement derived from the satellite position data on a photographic impression. The recorder 16 is capable of recording a visible position measurement derived from the satellite position data on a photographic impression. The photographic impression is a photographic film based impression in this embodiment. Other embodiments include digital photographs. A position measurement complete circuit 18 is electrically connected to the central processing unit 14. The position measurement complete circuit 18 is capable of determining whether said satellite position sensor data has been updated within a predetermined interval of activating the recorder 16. An encoding switch 20 is electrically connected to the central processing unit 14. The encoding switch 20 is electrically connected to the recorder 16. A visible ink cartridge 22 is electrically connected to the encoding switch 20 and communicates with the recorder 16. An ultraviolet ink cartridge 24 is electrically connected to the encoding switch 20 and communicates with the recorder 16. A memory module 26 is electrically connected to the central processing unit 14.

In use it can now be understood that the position information recording camera 10 is used as a conventional position recording camera except that the encoding switch 20 can be selected to encode the position of the photograph in ultraviolet ink for conventional photographs. The position information can be digitally encoded into the photograph in a digital camera.

While a preferred embodiment of the position information recording camera has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such plastic may be used instead of the metal described. And although satellite positioning systems that may be connected to a camera to imprint positioning data on a photograph have been described, it should be appreciated that the position information recording camera herein described is also suitable for tracking the global position of an object viewed through the viewfinder.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A position information recording camera comprising:
   a satellite position sensor connected to a conventional camera, said satellite position sensor capable of outputting satellite position data;
   a central processing unit electrically connected to said satellite position sensor, said central processing unit capable of deriving a position measurement from said satellite position data;
   a recorder connected to said conventional camera, said recorder electrically connected to said central processing unit, said recorder capable of recording said position measurement in an encoded form upon a photographic impression; and
   a visible ink cartridge electrically connected to said encoding switch, said visible ink cartridge communicating with said recorder.

2. The position information recording camera of claim 1 further comprising:
   an ultraviolet ink cartridge electrically connected to said encoding switch, said ultraviolet ink cartridge communicating with said recorder.

3. A position information recording camera comprising:
   a satellite position sensor collected to a conventional camera, said satellite position sensor capable of outputting satellite position data;
   a central processing unit electrically connected to said satellite position sensor, said central processing unit capable of deriving a position measurement from said satellite position data;
   a recorder connected to said conventional camera, said recorder electrically connected to said central processing unit, said recorder capable of recording said position measurement in an encoded form upon a photographic impression, said recorder is capable of recording a visible position measurement derived from said satellite position data on a photographic impression;
   an encoding switch electrically connected to said central processing unit, said encoding switch electrically connected to said recorder; and
   a visible ink cartridge electrically connected to said encoding switch, said visible ink cartridge communicating with said recorder.

4. The position information recording camera of claim 3 further comprising:
   an ultraviolet ink cartridge electrically connected to said encoding switch, said ultraviolet ink cartridge communicating with said recorder.

5. A position information recording camera comprising:
   a satellite position sensor connected to a conventional camera, said satellite position sensor capable of outputting satellite position data, said satellite position sensor is orientation insensitive;
   a central processing unit electrically connected to said satellite position sensor, said central processing unit capable of deriving a position measurement from said satellite position data;
   a recorder connected to said conventional camera, said recorder electrically connected to said central processing unit, said recorder capable of recording said position measurement in an encoded form upon a photographic impression, said recorder is capable of recording said position measurement visibly upon a photographic impression, said photographic impression is a photographic film based impression;
   a position measurement complete circuit electrically connected to said central processing unit, said position measurement complete circuit capable of determining whether said satellite position sensor data has been updated within a predetermined interval of activating said recorder;
   an encoding switch electrically connected to said central processing unit, said encoding switch electrically connected to said recorder;
   a visible ink cartridge electrically connected to said encoding switch, said visible ink cartridge communicating with said recorder;
   an ultraviolet ink cartridge electrically connected to said encoding switch, said ultraviolet ink cartridge communicating with said recorder; and
   a memory module electrically connected to said central processing unit.

* * * * *